3,339,371
METHOD OF CRYOGENICALLY SEPARATING COKE-OVEN GAS
Kiyoshi Ichihara, Hitachi-shi, Japan, assignor to Hitachi, Ltd., Chiyoda-ku, Tokyo, Japan, a corporation of Japan
Filed Sept. 4, 1964, Ser. No. 394,517
Claims priority, application Japan, Sept. 9, 1963, 38/47,720
4 Claims. (Cl. 62—26)

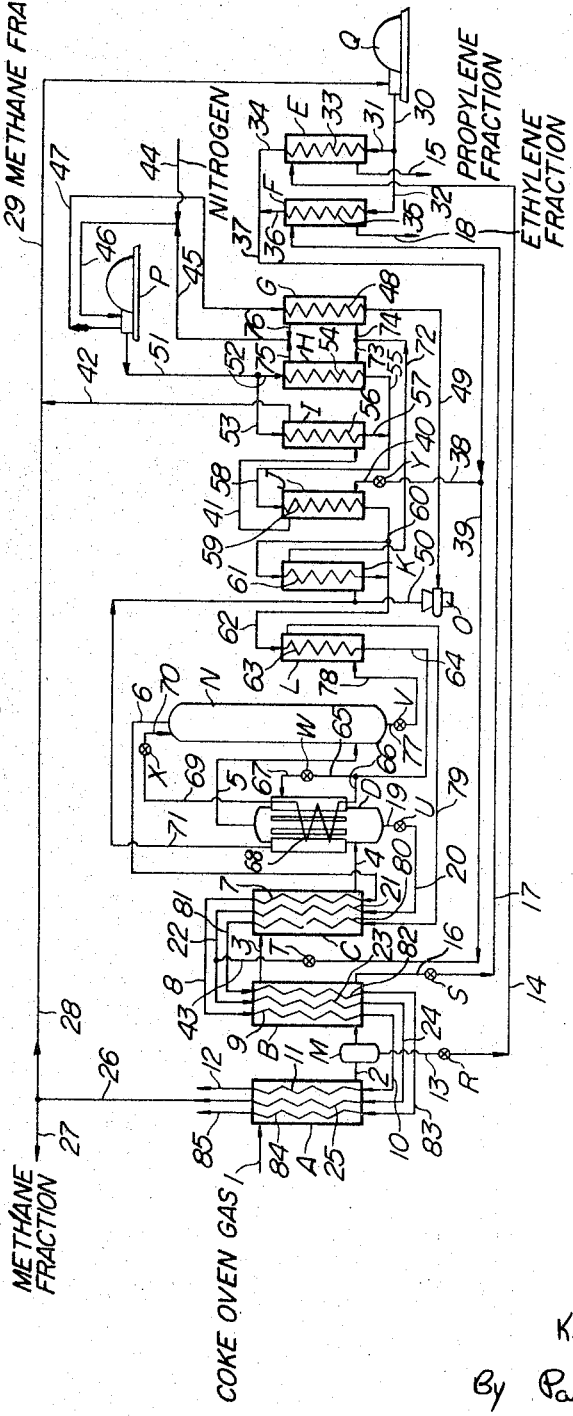

This invention relates to methods of cryogenic liquefaction of coke-oven gas for separating it into components such as hydrogen for ammonia synthesis, a methane fraction and an ethylene fraction.

The present invention has for its primary object to provide a new and improved method of cryogenically separating coke-oven gas into its components which is highly efficient involving a minimized overall power requirement and also needs a minimum of equipments.

According to the present invention, there is provided a method of cryogenically separating coke-oven gas including refrigerating the coke-oven gas for successive fractional liquefaction of the coke-oven gas into components in the order of from a highest-boiling component to successively lower-boiling components, said method comprising the steps of transferring cold held by a propylene fraction and an ethylene fraction obtained by the fractional liquefaction to a methane fraction also obtained by the fractional liquefaction and refrigerating the raw coke-oven gas by the cold transferred to the methane fraction.

According to the present invention, there is also provided a method of cryogenically separating coke-oven gas including refrigerating the coke-oven gas for successive fractional liquefaction of the coke-oven gas into components in the order of from a highest-boiling component to successively lower-boiling components, said method comprising the steps of transferring cold held by a propylene fraction and an ethylene fraction obtained by the fractional liquefaction to a methane fraction also obtained by the fractional liquefaction and refrigerating nitrogen gas by the cold transferred to the methane fraction.

There are other objects and particularities of the present invention which will become obvious from the following description with reference to the accompanying drawings, in which:

FIG. 3 is a schematic flow diagram of an apparatus for practising the method of cryogenic separation of coke-oven gas according to the present invention.

Figure 1:
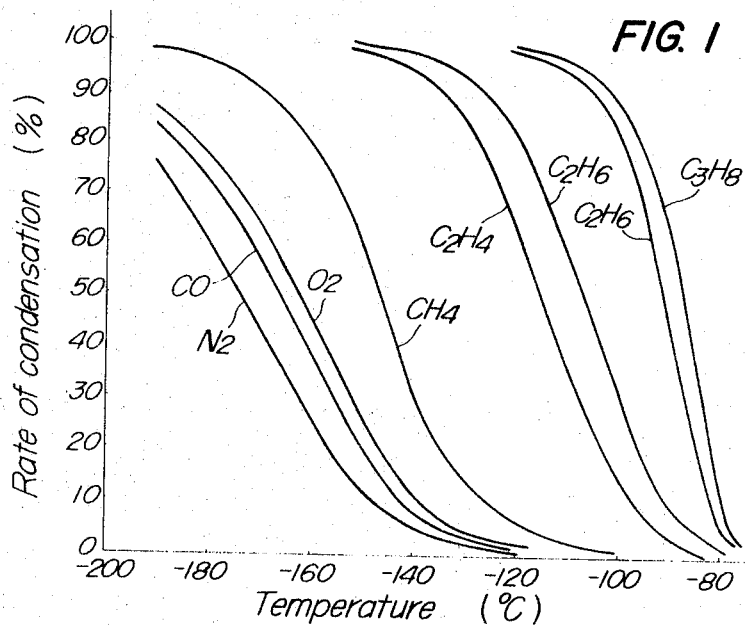
FIG. 1 is a graphic representation of the rate of condensation of various components of coke-oven gas relative to temperature at a pressure of 12 kg./cm.² gauge.

In general, coke-oven gas, which will be referred to hereinafter as C.O.G. for convenience, is a gas mixture including approximately ten components, for example, 54.2% $H_2$, 2.1% $N_2$, 6.1% CO, 0.1% $O_2$, 31.2% $CH_4$, 3.4% $C_2H_4$, 1.8% $C_2H_6$, 0.05% $C_2H_2$, and up to 1.1% $C_3$. Generally, the coke-oven gas is separated into components by the so-called cryogenic liquefaction method which utilizes differences between the boiling points of the components. Difficulties involved in such method are that C.O.G. is a multi-component gas mixture in which extremely low-boiling hydrogen is a majority component thereof and relatively high-boiling $C_2H_4$, $C_2H_6$, etc. of minority components have low partial pressures. Therefore, for properly effecting the fractional liquefaction of the latter components, refrigeration at a temperature far lower than the boiling points of these components per se must be made to effectively condense the same, as will be apparent from FIG. 1.

On the other hand, even when a liquid fraction separated by the fractional condensation is expanded to a low pressure for the purpose of recovery of cold therefrom, appreciable temperature drop would not result. Since the greater part of the cold held by the liquid fraction is in a temperature range in the vicinity of the boiling point of the major component forming the liquid fraction as will be described later, the cold can not thermodynamically directly be utilized to refrigerate raw C.O.G. Therefore, according to the general practice, the liquid fraction is brought into heat exchange with a suitable high pressure fluid having a low boiling point and thereafter the refrigerated low-boiling high-pressure fluid is expanded to a low pressure to obtain cold at a low temperature, the cold being utilized to refrigerate raw C.O.G. In a known apparatus for the cryogenic separation of C.O.G., nitrogen gas has been employed as the low-boiling fluid. However, the use of nitrogen gas involves various drawbacks as will be described hereinunder.

Figure 2:
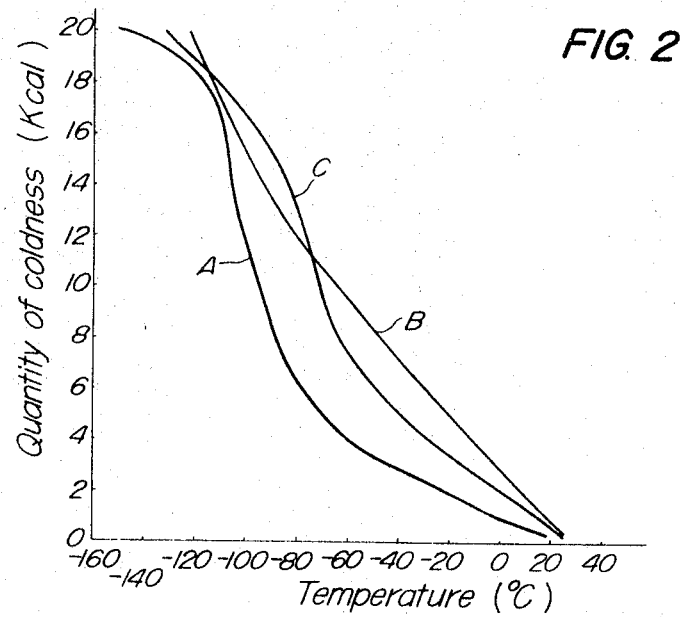
FIG. 2 is a graphic representation of thermal hysteresis of nitrogen, and a methane fraction and an ethylene fraction in coke-oven gas.

For the sake of materialized explanation, an ethylene fraction, or a liquid fraction chiefly of ethylene is cited herein as a condensate from which cold is to be recovered. When the apparatus is operating at a working pressure, for example, of 12 kg./cm.² gauge, raw C.O.G. at about $-100°$ C. is refrigerated through heat exchange to a temperature of from $-140°$ C. to $-145°$ C. to thereby separate the ethylene fraction in liquid state at a temperature of from $-110°$ C. to $-115°$ C. The composition of the ethylene fraction, for example, is 0.5% $H_2$, 0.5% $N_2$, 0.9% CO, 0.1% $O_2$, 28.3% $CH_4$, 46.4% $C_2H_4$, 20.2% $C_2H_6$, 0.6% $C_2H_2$, 1.6% $C_3H_6$ and 0.9% $C_3H_8$, thus ethylene forming the greater part of the fraction. A curve A in FIG. 2 shows an amount of cold held by the liquid fraction relative to temperature when the liquid fraction is expanded to 0.5 kg./cm.² gauge. From the curve, it will be seen that the greater part of the cold exists in a temperature range which is $\pm 20°$ C. on either side of the boiling point, $-97°$ C., of ethylene at a pressure of 0.5 kg./cm.² gauge. On the other hand, nitrogen gas to be brought into heat exchange with the ethylene fraction has such a thermodynamic property that it shows thermal hysteresis at a pressure of 100 atmospheres as shown by a curve B in FIG. 2. From the relation of temperature differential in heat exchange, the lowest refrigerating temperature of nitrogen gas is in the order of $-120°$ C. to $-125°$ C. Therefore, an amount of cold that can be recovered from a unit cubic meter (volume at 0° C. and 1 atmosphere) of nitrogen gas compressed to 100 atmospheres in a temperature range of from 30° C. to $-120°$ C. is 70.0 kcal./Nm.³. Assuming that 20,000 Nm.³/hr. of raw C.O.G. is to be treated, then, an amount of the ethylene fraction obtained from the raw C.O.G. is of the order of 1,180 Nm.³/hr. and the cold held by the ethylene fraction up to 25° C. is of the order of 199,750 kcal./hr. In order to recover the cold, 199,750/70.0=Nm.³/hr. of nitrogen gas, which is about 2.42 times the amount of the ethylene fraction, must be compressed to 100 atmospheres and circulated through the system. This results in an increase in power requirement and in a difficulty of maintenance due to circulation of such a large amount of high pressure fluid. Further, as will be apparent from FIG. 2, a marked difference in the temperature differential during heat exchange is unfavorable in respect of proper operation.

The present invention has been made to eliminate the above defects of prior methods and utilizes a methane fraction separated from C.O.G. as a high pressure fluid to be brought into heat exchange with an ethylene fraction. According to the present invention, cold of a propylene fraction and an ethylene fraction is transferred at first to a methane fraction and cold transferred to the methane fraction is utilized to refrigerate raw C.O.G. or nitrogen gas, whereby to reduce an amount of circulation of high pressure fluid, to minimize power requirement and to facilitate maintenance of the system. It is to be noted that a maximum pressure of 60 atmospheres suffices in a C.O.G. separation apparatus for practising the present invention whereas prior C.O.G. separation apparatus require a maximum pressure of from 100 to 140 atmospheres. The methane fraction separated from C.O.G., for example, consists of 1.2% $H_2$, 3.1% $N_2$, 11.1% CO, 0.2% $O_2$, 84.2% $CH_4$ and 0.2% $C_2H_4$, and its thermal hysteresis at the pressure cited above is as shown by a curve C in FIG. 2. The methane fraction has such a thermodynamic property that it can be utilized to a temperature lower than with nitrogen gas for recovery of cold.

The thermal capacity in a temperature range of from 30° C. to —130° C. of the methane fraction compressed to 60 atmospheres per unit cubic meter (volume at 0° C. and 1 atmosphere) is 118.88 kcal./$Nm.^3$. Therefore, an amount of the methane fraction to be circulated is 199,-750/118.88≒1,680 $Nm.^3$/hr., that is, an amount 1.42 times an amount of the ethylene fraction against 2.42 times in the case of nitrogen gas. Thus, a far lesser amount of circulation and a lower pressure suffice in the case of the methane fraction. The same applies to a propylene fraction obtained by refrigerating raw C.O.G. down to —100° C., and this provides an additional effect in the fractional separation of C.O.G. Now, the prior method and the inventive method will be compared in respect of power requirement. In C.O.G. separation apparatus which treats 20,000 $Nm.^3$/hr. of raw C.O.G. to produce a gas mixture for the synthesis of ammonia including 75% $H_2$ and 25% $N_2$, methane fraction, ethylene fraction and propylene fraction, the power requirement is 4,900 kwh. with the prior method employing solely nitrogen gas whereas the power requirement is 4,700 kwh. with the inventive method.

A preferred arrangement and operation of an apparatus for practising the present invention will now be described with reference to FIG. 3 of the drawing.

Referring to FIG. 3, reference characters A, B, C, D, E, F, G, H, I, J, K and L indicate heat exchangers; M a gas-liquid separator; N a nitrogen washing tower; O an expansion turbine; P a nitrogen compressor; Q a methane fraction compressor; and R, S, T, U, V, W, X and Y expansion valves.

Raw C.O.G., preliminarily purified by having been eliminated therefrom impurities such as carbon dioxide gas, then dehydrated and sufficiently dried, is compressed to 12 kg./$cm.^2$ gauge at atmospheric temperature and is admitted into the apparatus by way of a line 1. The C.O.G. is refrigerated in the heat exchanger A to a temperature of —100° C. by heat exchange with a gaseous fraction previously obtained in the system in a manner described hereinafter so that its propylene fraction is liquefied. The refrigerated C.O.G. is then conducted through a line 2 into the gas-liquid separator M where the propylene fraction is separated, while the remaining gas is led into the heat exchanger B. In the heat exchanger B, the raw C.O.G. is refrigerated to a temperature of from —143° C. to —145° C. by the cold held by the return gases to separate a liquid fraction, chiefly of ethylene, which is guided downwardly of the system. The remaining gas mainly consisting of hydrogen and methane is led through a line 3 into the heat exchanger C. The C.O.G. refrigerated in the heat exchanger C to a temperature of from —180° C. to —185° C. is led through a line 4 into the heat exchanger D refrigerated by liquid nitrogen, where it is refrigerated to a temperature below —190° C. so that almost all of components having a higher boiling point than nitrogen are liquefied to leave raw hydrogen gas with a purity of from 93 to 95%. The raw hydrogen gas is then led through a line 5 into the nitrogen washing tower N and is refrigerated by liquid nitrogen supercooled to a temperature below —192° C. and flowing downwardly from a pipe 70 at the top of the tower N, so that carbon monoxide, oxygen and methane remaining therein are removed by condensation. The purified hydrogen is led out of the tower N through a line 6, a coiled tube 7 provided in the heat exchanger C, a line 8, a coiled tube 9 in the heat exchanger B and a line 10 into a coiled tube 11 in the heat exchanger A to be raised to the atmospheric temperature releasing its cold and is finally discharged exteriorly of the system through a line 12.

Meanwhile, the propylene fraction separated in the gas-liquid separator M is led through a line 13 into the expansion valve R to be expanded to atmospheric pressure and then led through a line 14 into the heat exchanger E, where the propylene fraction is brought into heat exchange with the methane fraction flowing through a coiled tube 33 to transfer its cold to the methane fraction and is discharged exteriorly of the system by way of a line 15. The ethylene fraction separated in the heat exchanger B is led through a line 16 into the expansion valve S to be expanded to atmospheric pressure and then led through a line 17 into the heat exchanger F, where the ethylene fraction is brought into heat exchange with the methane fraction flowing through a coiled tube 35 to transfer its cold to the methane fraction and is discharged exteriorly of the system by way of a line 18.

The methane fraction separated in the heat exchanger D is led through a line 19 into the expansion valve U to be expanded to atmospheric pressure, gives up its cold while flowing through a line 20, a coiled tube 21 in the heat exchanger C, a line 22, a coiled tube 23 in the heat exchanger B, a line 24 and a coiled tube 25 in the heat exchanger A and is finally discharged exteriorly of the system by way of lines 26 and 27. A line 28 is branched from the line 26 to divert a portion of the methane fraction which joins the methane fraction from a line 42 and is led through a line 29 into the methane fraction compressor Q, where the methane fraction is compressed to a pressure of 60 atmospheres and is supplied into the heat exchangers E and F through respective lines 31 and 32 branched from a line 30 connected with the compressor Q. The methane fractions refrigerated to temperatures of —95° C. and —130° C. by the propylene fraction flowing the shell-side of the heat exchanger E and the ethylene fraction flowing the shell-side of the heat exchanger F, respectively, are taken out of the heat exchangers through respective lines 34 and 36 and again join together in a line 37. A portion of the methane fraction from the line 37 is led through a line 38 into the expansion valve Y, where it is expanded to atmospheric pressure and is lowered in its temperature, thence it enters the heat exchanger J through a line 40 to refrigerate nitrogen gas at a pressure of 35 to 40 atmospheres flowing through a coiled tube 59 in the heat exchanger J. The methane fraction is then led through a line 41 and the shell-side of the heat exchanger I to be restored to atmospheric temperature and then led through the line 42 to join with that portion of the methane fraction coming through the line 28 to return into the methane fraction compressor Q by way of the line 29. On the other hand, the remaining portion of the methane fraction flowing through the line 37 is led through a line 39 into the expansion valve T, where it is expanded to atmospheric pressure, and then joins with that portion of the methane fraction led through the line 22 to refrigerate the raw C.O.G. by the cold held thereby.

Nitrogen gas at atmospheric temperature and pressure supplied to the system through a line 44 joins with nitrogen gas returning through a line 45 to enter the nitrogen compressor P through a line 46 to be compressed to a pressure of from 35 to 40 atmospheres. A portion of the nitrogen gas is only compressed to a pressure of the order of 6 atmospheres and is led through a line 47 into the heat exchanger G to flow through a coiled tube 48 therein. While flowing through the coiled tube 48, the nitrogen gas is refrigerated to a temperature of the order of −150° C. by the cold held by nitrogen gas flowing the shell-side of the heat exchanger G and is led through a line 49 into the expansion turbine O, where the nitrogen gas is adiabatically expanded to generate cold matching with system heat losses due to heat leakage, etc., thence it is led through a line 50 into the heat exchanger K at a temperature of the order of −190° C. Meanwhile, the major portion of the nitrogen gas compressed by the compressor P to the pressure of 35 to 40 atmospheres and leaving the compressor P through a line 51 is divided into two flows running through respective lines 52 and 53. The nitrogen gas flowing through the line 52 enters the heat exchanger H to flow through its coiled tube 54 and is refrigerated to a temperature of −140° C. to −150° C. through heat exchange with the returning flow of nitrogen gas, while the nitrogen gas flowing through the line 53 enters the heat exchanger I to flow through its coiled tube 56 and is refrigerated to a temperature of −140° C. to −150° C. through heat exchange with the methane fraction fed into the heat exchanger I through the line 41 and flowing the shell-side thereof. The nitrogen gas discharged from the heat exchanger H through a line 55 and the nitrogen gas from the heat exchanger I through a line 57 join together to flow into the heat exchanger J through a line 58. While flowing through the coiled tube 59 in the heat exchanger J, the nitrogen gas is liquefied by the cold of the methane fraction supplied into the heat exchanger J through the line 40 and flowing the shell-side thereof and is fed into the heat exchanger K through a line 60. In the heat exchanger K, the liquid nitrogen flows through a coiled tube 61 therein to be supercooled by the returning flow of nitrogen gas flowing the shell side of the heat exchanger K and is led through a line 62 into the heat exchanger L, where the liquid nitrogen flows through its coiled tube 63 for being further supercooled by a liquid washing waste fed out of the bottom of the nitrogen washing tower N and supplied to the heat exchanger L through a line 77, the expansion valve V and a line 78, and is then taken out through a line 64. The gaseous washing waste given up a portion of its cold in the heat exchanger L then flows through a line 79, a coiled tube 80 in the heat exchanger C, a line 81, a coiled tube 82 in the heat exchanger B, a line 83, and a coiled tube 84 in the heat exchanger A to transfer the remaining portion of its cold to the raw C.O.G., and is discharged exteriorly of the system through a line 85. The flow of the supercooled compressed nitrogen running through the line 64 in the form of liquid is divided into two flows running through respective lines 65 and 66. That portion of liquid nitrogen flowing through the line 65 is led into the expansion valve W to be expanded to atmospheric pressure, thence through a line 67 into the heat exchanger D to act as a source of refrigeration. The nitrogen gasified in the heat exchanger D is taken out thereof through a line 71 at a temperature of the order of −192° C. to −195° C., joins with the nitrogen gas having passed through the expansion turbine O and the line 50, and is led into the heat exchanger K. The nitrogen gas leaving the heat exchanger K through a line 72 is divided into two flows running through respective lines 73 and 74. That portion of the nitrogen gas led into the heat exchanger H through the line 73 gives up its cold in the heat exchanger H to flow outwardly thereof through a line 75, while the remaining portion of the nitrogen gas led into the heat exchanger G through the line 74 gives up its cold to the compressed nitrogen gas to flow outwardly thereof through a line 76. The flows of nitrogen gas through the lines 75 and 76 join together to flow back to the nitrogen compressor P through the lines 45 and 46 for circulation again through the system. On the other hand, that portion of liquid nitrogen flowing through the line 66 is led through a coiled tube 68 in the heat exchanger D to be supercooled to a temperature of from −192° C. to −193° C. and then led through a line 69 into the expansion valve X, where it is expanded to the operating pressure of the nitrogen washing tower N for supply to the nitrogen washing tower N through the line 70 as a washing liquid.

It will be apparent from the foregoing description that the present invention provides various marked advantages over prior methods in that the maximum pressure in the system is 60 atmospheres which is about the half of the pressure generally employed in prior apparatus thus facilitating the maintenance of the system and in that the overall power requirement is less than with prior apparatus. As will readily be understood by those skilled in the art, the invention provides a further advantage that the cold recovered from the ethylene fraction and the propylene fraction can be added in approximately liquefied and evaporated form to the system of washing nitrogen so that a great rate of heat transfer can be employed and the heat exchangers can be correspondingly made compact. Moreover, according to the present invention, it is easy to provide a system arrangement in which a cryogenic source in the form of a turbine-type expander can be made independent of the remainder of the system and thus the system can extremely easily be operated.

What is claimed is:

1. A method of cryogenically separating coke-oven gas including refrigerating the coke-oven gas for successive fractional liquefaction of the coke-oven gas into components in the order of from a highest-boiling component to successively lower-boiling components, said method comprising the steps of transferring cold held by a liquid propylene fraction and a liquid ethylene fraction obtained by the fractional liquefaction in parallel but separate heat exchangers to a compressed gaseous methane fraction also obtained by the fractional liquefaction and refrigerating the raw coke-oven gas by the cold transferred to the methane fraction.

2. The method of cryogenically separating coke-oven gas according to claim 1, wherein said methane fraction obtained by the fractional liquefaction of the coke-oven gas is compressed to a pressure of about 60 atmospheres before being refrigerated by cold transferred to said methane fraction by the liquid propylene fraction and the liquid ethylene fraction and before said methane fraction is circulated through the system.

3. A method of cryogenically separating coke-oven gas including refrigerating the coke-oven gas for successive fractional liquefaction of the coke-oven gas into components in the order of from a highest-boiling component to successively lower boiling components, said method comprising the steps of transferring cold held by a liquid propylene fraction and a liquid ethylene fraction obtained by the fractional liquefaction in parallel but separate heat exchangers to a compressed gaseous methane fraction also obtained by the fractional liquefaction and refrigerating a nitrogen gas by the cold transferred to the methane fraction.

4. The method of cryogenically separating coke-oven gas according to claim 2, wherein said methane fraction obtained by the fractional liquefaction of the coke-oven gas is compressed to a pressure of about 60 atmospheres before being refrigerated by cold transferred to said methane fraction by the liquid propylene fraction and the liquid ethylene fraction and before said methane fraction is circulated through the system.

References Cited

UNITED STATES PATENTS

| 1,913,805 | 6/1933 | Hausen | 62—23 XR |
| 2,591,658 | 4/1952 | Haringhuizen | 62—23 |
| 3,062,015 | 11/1962 | Cost | 62—23 |
| 3,224,208 | 12/1965 | Schlumberger et al. | 62—26 XR |

NORMAN YUDKOFF, *Primary Examiner.*

WILBUR L. BASCOMB, JR., *Examiner.*

V. W. PRETKA, *Assistant Examiner.*